United States Patent
Xu

(10) Patent No.: US 10,678,303 B2
(45) Date of Patent: Jun. 9, 2020

(54) METHOD FOR CONTROLLING ELECTRONIC DEVICE AND ELECTRONIC DEVICE

(71) Applicants: Beijing Lenovo Software Ltd., Beijing (CN); Lenovo (Beijing) Limited, Beijing (CN)

(72) Inventor: Ben Xu, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 420 days.

(21) Appl. No.: 14/967,590

(22) Filed: Dec. 14, 2015

(65) Prior Publication Data
US 2017/0038800 A1 Feb. 9, 2017

(30) Foreign Application Priority Data
Aug. 3, 2015 (CN) .......................... 2015 1 0482061

(51) Int. Cl.
*G06F 1/16* (2006.01)
(52) U.S. Cl.
CPC ............ *G06F 1/1652* (2013.01); *G06F 1/163* (2013.01); *G06F 1/1675* (2013.01)
(58) Field of Classification Search
CPC ......... G06F 1/1652; G06F 2203/04102; G06F 3/017; G06F 1/1641; G06F 3/0484;
(Continued)

(56) References Cited

U.S. PATENT DOCUMENTS

| 8,836,643 | B2* | 9/2014 | Romera Joliff | ......... G06F 3/016 |
| | | | | 345/168 |
| 9,696,859 | B1* | 7/2017 | Heller | ..................... G06F 3/012 |

(Continued)

FOREIGN PATENT DOCUMENTS

| CN | 103425243 A | 12/2013 |
| CN | 104122992 A | 10/2014 |

(Continued)

OTHER PUBLICATIONS

"Chinese Application No. 201510482061.0 Office Action dated Sep. 18, 2018", w/English Translation, 18 pgs.
(Continued)

*Primary Examiner* — Darrin D Dunn
(74) *Attorney, Agent, or Firm* — Schwegman Lundberg & Woessner, P.A.

(57) ABSTRACT

The present disclosure provides a method for controlling an electronic device and the electronic device. The method comprising: detecting a bending operation for deforming a flexible screen of the electronic device applied by an operator to the electronic device; determining whether the bending operation satisfies a preset condition or not; and when the bending operation satisfies the preset condition, controlling the flexible screen to be deformed from a first bent state to a second bent state, and after the bending operation is no longer applied to the electronic device, controlling the flexible screen to be deformed from the second bent state to a third bent state. The method according to the present disclosure may control a bending angle of the flexible screen accurately.

4 Claims, 2 Drawing Sheets

(58) Field of Classification Search
CPC ...... G06F 2200/1636; G06F 2203/013; H04M 1/0268; G09F 9/301; G02F 1/13338; G02F 2001/133314; G05B 15/02
See application file for complete search history.

(56) References Cited

U.S. PATENT DOCUMENTS

| | | | |
|---|---|---|---|
| 10,061,350 B2* | 8/2018 | Magi | G06F 1/163 |
| 2011/0188189 A1* | 8/2011 | Park | G05B 11/01 |
| | | | 361/679.05 |
| 2012/0038613 A1* | 2/2012 | Choi | G06F 1/1652 |
| | | | 345/211 |
| 2013/0009882 A1* | 1/2013 | Salmela | G06F 3/016 |
| | | | 345/173 |
| 2013/0165945 A9* | 6/2013 | Roelle | A61B 34/71 |
| | | | 606/130 |
| 2013/0169562 A1* | 7/2013 | Cho | G06F 3/0488 |
| | | | 345/173 |
| 2013/0201115 A1* | 8/2013 | Heubel | G06F 3/0487 |
| | | | 345/173 |
| 2013/0265221 A1* | 10/2013 | Lee | G06F 3/01 |
| | | | 345/156 |
| 2013/0265262 A1* | 10/2013 | Jung | G06F 3/041 |
| | | | 345/173 |
| 2014/0004906 A1* | 1/2014 | Chi | H04B 1/38 |
| | | | 455/566 |
| 2014/0028597 A1* | 1/2014 | Cho | G06F 3/0487 |
| | | | 345/173 |
| 2014/0049463 A1* | 2/2014 | Seo | G06F 3/0487 |
| | | | 345/156 |
| 2014/0098075 A1* | 4/2014 | Kwak | G06F 3/0487 |
| | | | 345/204 |
| 2014/0104244 A1* | 4/2014 | Baldwin | G06F 1/1626 |
| | | | 345/204 |
| 2014/0118910 A1* | 5/2014 | Sung | G09F 9/301 |
| | | | 361/679.01 |
| 2014/0320393 A1* | 10/2014 | Modarres | G06F 3/017 |
| | | | 345/156 |
| 2014/0320400 A1* | 10/2014 | Jiang | G06F 3/016 |
| | | | 345/156 |
| 2014/0347287 A1* | 11/2014 | Lee | G06F 1/1652 |
| | | | 345/173 |
| 2015/0091711 A1* | 4/2015 | Kosonen | G08B 6/00 |
| | | | 340/407.1 |
| 2015/0185764 A1* | 7/2015 | Magi | G06F 1/163 |
| | | | 361/679.03 |
| 2015/0187325 A1* | 7/2015 | Yeo | H04N 5/4403 |
| | | | 345/156 |
| 2015/0195926 A1* | 7/2015 | Kandur Raja | G06F 1/1605 |
| | | | 348/373 |
| 2015/0220119 A1* | 8/2015 | Seo | G06F 3/041 |
| | | | 345/173 |
| 2015/0355728 A1* | 12/2015 | Cho | G06F 1/1652 |
| | | | 345/173 |
| 2016/0103488 A1* | 4/2016 | Levesque | G06F 3/016 |
| | | | 345/156 |
| 2016/0147262 A1* | 5/2016 | Lee | G06F 1/1626 |
| | | | 345/173 |
| 2016/0185309 A1* | 6/2016 | Di Censo | B60R 16/037 |
| | | | 701/49 |
| 2016/0190428 A1* | 6/2016 | Lim | G06F 1/1652 |
| | | | 310/317 |
| 2016/0210826 A1* | 7/2016 | Kosonen | G08B 6/00 |
| 2016/0249475 A1* | 8/2016 | Park | G02F 1/133305 |
| 2016/0270208 A1* | 9/2016 | Bostick | H05K 5/0217 |
| 2017/0003825 A1* | 1/2017 | Kwak | G06F 3/0487 |
| 2017/0031526 A1* | 2/2017 | Hyde | G06F 3/041 |
| 2017/0060179 A1* | 3/2017 | Magi | G06F 1/163 |
| 2017/0060248 A1* | 3/2017 | Modarres | G06F 3/017 |
| 2017/0136350 A1* | 5/2017 | Levesque | G06F 3/0487 |
| 2017/0147067 A1* | 5/2017 | Levesque | G06F 3/016 |
| 2017/0162171 A1* | 6/2017 | Cho | G09G 5/02 |
| 2017/0185154 A1* | 6/2017 | Chatterjee | G06F 3/016 |
| 2017/0228122 A1* | 8/2017 | Levesque | G06F 3/041 |
| 2017/0242488 A1* | 8/2017 | Levesque | G06F 3/011 |
| 2018/0039302 A1* | 2/2018 | Levesque | G06F 1/1652 |
| 2018/0074585 A1* | 3/2018 | Levesque | G06F 3/016 |
| 2018/0181205 A1* | 6/2018 | Cruz-Hernandez | G06F 3/016 |
| 2019/0139515 A1* | 5/2019 | Inagaki | G06F 3/0412 |

FOREIGN PATENT DOCUMENTS

| | | |
|---|---|---|
| CN | 104135831 A | 11/2014 |
| CN | 104754084 A | 7/2015 |
| CN | 104811517 A | 7/2015 |
| EP | 2757439 A1 | 7/2014 |

OTHER PUBLICATIONS

"Chinese Application No. 201510482061.0, Office Action dated Jan. 23, 2018", w/ English Translation, (dated Jan. 23, 2018), 15 pgs.

\* cited by examiner

METHOD FOR CONTROLLING ELECTRONIC DEVICE AND ELECTRONIC DEVICE

CROSS-REFERENCE TO RELATED APPLICATION(S)

This application claims priority to the Chinese Patent Application No. 201510482061.0, filed on Aug. 3, 2015, entitled "METHOD FOR CONTROLLING ELECTRONIC DEVICE AND ELECTRONIC DEVICE" which is incorporated herein by reference in its entirety.

TECHNICAL FIELD

The present disclosure relates to the field of electronic technology, and more particularly, to a method for controlling an electronic device and the electronic device.

BACKGROUND

With a development of electronic technology, electronic devices such as smart phones and tablet computers or the like increasingly enter people's life, and have become an indispensable part of people's work and life.

Currently, these electronic devices are not limited to be in a normal state, and comprise an electronic device having a flexible screen. Compared with common electronic devices, the electronic device having a flexible screen has characteristics such as foldability and bendability. After the electronic device having a flexible screen is folded and bent, it occupies a small space and is portable. In normal cases, after the flexible screen is bent to a certain state under an external force, if the external force is released, the flexible screen maintains unchanged in the current state. For example, if a user wants to bend the electronic device having a flexible screen to have a shape which matches with a shape of a wrist of the user, the electronic device having a flexible screen may be bent and adjusted many times so that a bending angle thereof matches with the wrist of the user.

However, in the process of bending the electronic device having a flexible screen to a particular angle, multiple adjustment operations are generally needed to be implemented, and the bending angle of the flexible screen typically cannot be accurately controlled by a manual adjustment operation of the user. Thus, the conventional electronic device having a flexible screen can only be bent under an external force, and the bending angle of the flexible screen cannot be accurately controlled.

SUMMARY

The present disclosure provides a method for controlling an electronic device and the electronic device.

In an aspect, the embodiments of the present disclosure provide a method for controlling an electronic device, the method comprising:

detecting a bending operation for deforming a flexible screen of the electronic device applied by an operator to the electronic device;

determining whether the bending operation satisfies a preset condition or not; and controlling the flexible screen to be deformed from a first bent state to a second bent state when the bending operation satisfies the preset condition, and controlling the flexible screen to be deformed from the second bent state to a third bent state after the bending operation is no longer applied to the electronic device, wherein the first bent state is a state in which the flexible screen is bent at a first bending angle, the second bent state is a state in which the flexible screen is bent at a second bending angle, and the third bent state is a state in which the flexible screen is bent at a third bending angle which is the same as or different from the first bending angle.

Alternatively, the method further comprises:

controlling the flexible screen to be deformed from the first bent state to the second bent state when the bending operation does not satisfy the preset condition, and controlling the flexible screen to maintain unchanged in the second bent state after the bending operation is no longer applied to the electronic device.

Alternatively, determining whether the bending operation satisfies a preset condition or not comprises:

determining whether a duration of the bending operation is less than a preset duration or not, wherein if the duration is less than the preset duration, then the bending operation satisfies the preset condition.

Alternatively, determining whether the bending operation satisfies a preset condition or not comprises:

determining whether a pressure corresponding to the bending operation is greater than a preset pressure threshold or not, wherein when the pressure is greater than the preset pressure threshold, the bending operation satisfies the preset condition.

In another aspect, the embodiments of the present disclosure further provide an electronic device, comprising:

a flexible screen; and a processor connected to the flexible screen and configured to detect a bending operation for deforming the flexible screen applied by an operator to the electronic device; determine whether the bending operation satisfies a preset condition or not; and when the bending operation satisfies the preset condition, control the flexible screen to be deformed from a first bent state to a second bent state, and after the bending operation is no longer applied to the electronic device, control the flexible screen to be deformed from the second bent state to a third bent state, wherein the first bent state is a state in which the flexible screen is bent at a first bending angle, the second bent state is a state in which the flexible screen is bent at a second bending angle, and the third bent state is a state in which the flexible screen is at a third bending angle which is the same as or different from the first bending angle.

Alternatively, the processor is further configured to:

when the bending operation does not satisfy the preset condition, control the flexible screen to be deformed from the first bent state to the second bent state, and after bending operation is no longer applied to the electronic device, control the flexible screen to maintain unchanged in the second bent state.

Alternatively, the processor is further configured to:

determine whether a duration of the bending operation is less than a preset duration or not, wherein when the duration is less than the preset duration, the bending operation satisfies the preset condition.

Alternatively, the processor is further configured to:

determine whether a pressure corresponding to the bending operation is greater than a preset pressure threshold, wherein when the pressure is greater than the preset pressure threshold, the bending operation satisfies the preset condition.

In a further aspect, the embodiments of the present disclosure further provide an electronic device having a flexible screen, comprising:

a detection unit configured to detect a bending operation for deforming the flexible screen applied by an operator to the electronic device;

a determination unit configured to determine whether the bending operation satisfies a preset condition or not; and a control unit configured to, when the bending operation satisfies the preset condition, control the flexible screen to be deformed from a first bent state to a second bent state, and after the bending operation is no longer applied to the electronic device, control the flexible screen to be deformed from the second bent state to a third bent state, wherein the first bent state is a state in which the flexible screen is bent at a first bending angle, the second bent state is a state in which the flexible screen is bent at a second bending angle, and the third bent state is a state in which the flexible screen is bent at a third bending angle which is the same as or different from the first bending angle.

DETAILED DESCRIPTION

Embodiments of the present disclosure provide a method for controlling an electronic device and the electronic device. Under the control of a bending operation of a user, a flexible screen is deformed from a first bent state to a second bent state, and after application of the bending operation is stopped by the user, the flexible screen is deformed from the second bent state to a third bent state, so that a bending angle of the flexible screen can be accurately controlled.

One aspect of the embodiment of the present application provide a method for controlling an electronic device, the method comprising:

detecting a bending operation for deforming a flexible screen of the electronic device applied by an operator to the electronic device;

determining whether the bending operation satisfies a preset condition or not; and controlling the flexible screen to be deformed from a first bent state to a second bent state when the bending operation satisfies the preset condition, controlling the flexible screen to be deformed from the second bent state to a third bent state and after the bending operation is no longer applied to the electronic device, wherein the first bent state is a state in which the flexible screen is bent at a first bending angle, the second bent state is a state in which the flexible screen is bent at a second bending angle, and the third bent state is a state in which the flexible screen is bent at a third bending angle which is the same as or different from the first bending angle.

According to the solution above, after the bending operation is no longer applied to the electronic device, the flexible screen is still deformed from the second bent state to the third bent state which may be the same as or different from the first bent state. Further, as long as the bending operation applied by the user satisfies the preset condition, the flexible screen will finally be bent to the third bent state, so that the bending angle of the flexible screen can be accurately controlled.

Embodiments of the present disclosure will be described in detail below with reference to the accompanying drawings.

First Embodiment

The embodiments of the present disclosure provide a method for controlling an electronic device having a flexible screen applied in the electronic device. Further, the flexible screen may also be a touch screen, or a non-touch screen. Specifically, the electronic device may be a device having a flexible screen, such as a smart phone, a tablet computer or the like, which is not limited in the present disclosure.

Figure 1:
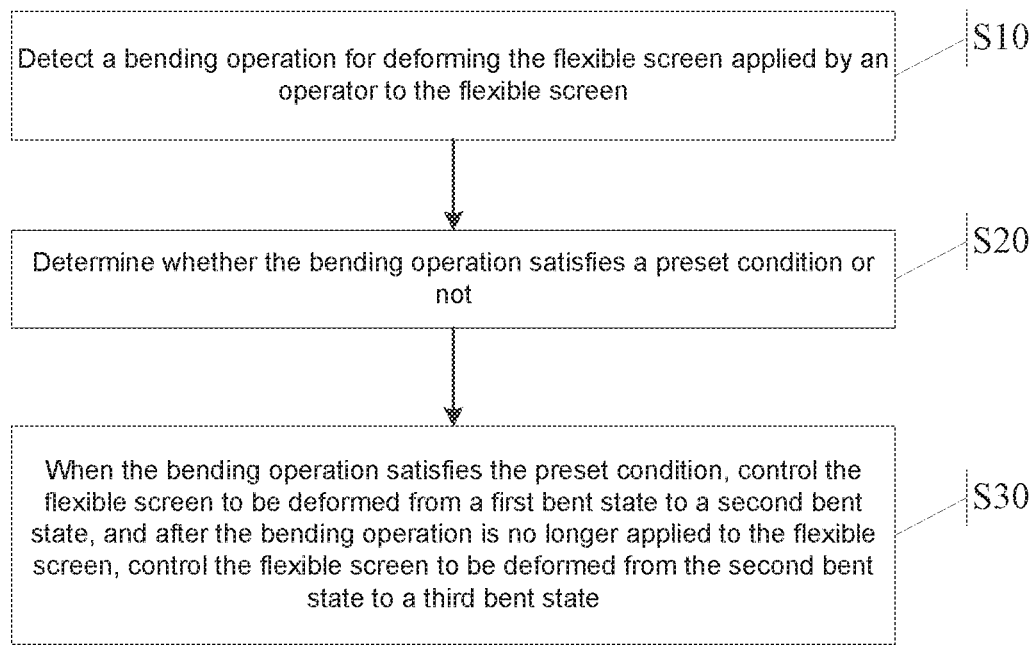
FIG. 1 is a flowchart of a method for controlling an electronic device according to a first embodiment of the present disclosure.

As shown in FIG. 1, the method comprises the following steps.

In S10, a bending operation for deforming the flexible screen applied by an operator to the electronic device is detected.

In S20, it is determined whether the bending operation satisfies a preset condition or not.

In S30, when the bending operation satisfies the preset condition, the flexible screen is controlled to be deformed from a first bent state to a second bent state, and after the bending operation is no longer applied to the electronic device, the flexible screen is controlled to be deformed from the second bent state to a third bent state.

The first bent state is a state in which the flexible screen is bent at a first bending angle, the second bent state is a state in which the flexible screen is bent at a second bending angle, and the third bent state is a state in which the flexible screen is bent at a third bending angle which is the same as or different from the first bending angle.

Figure 2:
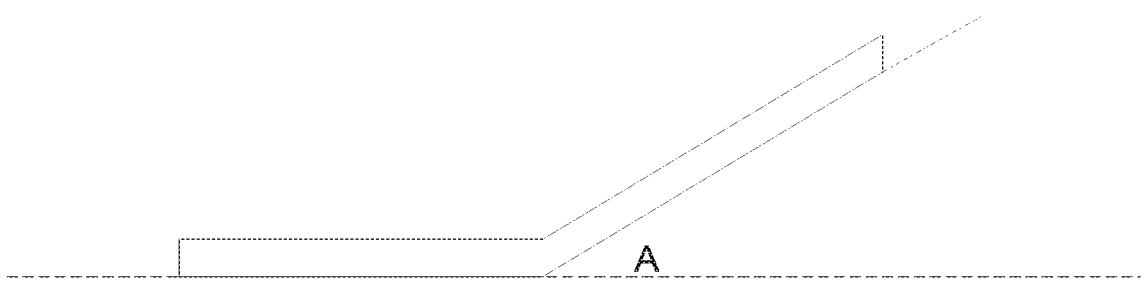
FIG. 2 is a diagram of a bending angle of the electronic device according to the first embodiment of the present disclosure.

In S10, the operator may be a hand of the user, and flexible screen is deformed by applying the bending operation to the electronic device. Specifically, the flexible screen is deformed to a certain bending angle under the control of the bending operation. As shown in FIG. 2, illustrated is a side view of the electronic device, wherein A is the bending angle of the flexible screen.

After the bending operation is detected, S20 is performed for the electronic device, i.e., determining whether the bending operation satisfies a preset condition or not.

In the embodiment of the present disclosure, satisfying a preset condition may comprise a force of the bending operation applied by the user to the electronic device satisfying the preset condition. Specifically, when a pressure corresponding to the bending operation is greater than a preset pressure threshold, it is determined that the bending operation satisfies the preset condition. In the embodiment of the present disclosure, the pressure may be a maximum transient force or an average force in the process of applying the bending operation, which is not limited in the present disclosure.

Specifically, a preset pressure threshold may be preset in the electronic device. The preset pressure threshold may be set according to users' habits. For example, when the electronic device is bent by a user, in turn the flexible screen is bent, in a normal case, the applied force is 5 N (Newton).

In this case, the preset pressure threshold may be set to 7 N or 8 N to determine whether the bending operation satisfies the preset condition according to the force corresponding to the bending operation applied by the user to the electronic device.

For example, the preset pressure threshold set in the electronic device is 8 N. If the force of the bending operation applied by the user to the electronic device is 3 N, it is determined that the bending operation does not satisfy the preset condition. If the force of the bending operation applied by the user to the electronic device is 10 N, it is determined that the bending operation satisfies the preset condition.

In the embodiment of the present disclosure, satisfying a preset condition may further comprise duration of the bending operation applied by the user to the electronic device satisfying the preset condition. Specifically, when the duration of the bending operation is less than preset duration, it is determined that the bending operation satisfies the preset condition.

Specifically, a preset duration may be preset in the electronic device. The preset duration may be set according to users' habits. For example, when the electronic device is bent by a user, in a normal case, the duration does not exceed 2 s (second). In this case, the duration may be set to 2 s or 3 s, so as to determine whether the bending operation satisfies the preset condition or not according to the duration of the bending operation applied by the user to the electronic device. In a specific implementation, the preset duration may further be set according to attributes of a material. For example, when duration of a bending operation for a material does not exceed 2 s, the material is rebounded after the bending operation is released. In this case, when the duration of the bending operation for a flexible screen made of the material does not exceed 2 s, the flexible screen is also rebounded after the bending operation is released. If the duration of the bending operation exceeds 2 s, the flexible screen maintains unchanged in the bent state. In this case, the duration may be preset to 2 s.

For example, the preset duration set in the electronic device is 2 s. If the duration of the bending operation applied by a user to the electronic device is 1.5 s, it is determined that the bending operation satisfies the preset condition. If the duration of the bending operation applied by a user to the electronic device is 4s, it is determined that the bending operation does not satisfy the preset condition.

In the embodiment of the present disclosure, the pressure and duration of the bending operation applied by the user to the electronic device may be detected by an array of pressure sensors arranged on the flexible screen.

After S20, S30 is performed for the electronic device, i.e., when the bending operation satisfies the preset condition, controlling the flexible screen to be deformed from a first bent state to a second bent state, and after the bending operation is no longer applied to the electronic device, controlling the flexible screen to be deformed from the second bent state to a third bent state. The first bent state is a state in which the flexible screen is bent at a first bending angle, the second bent state is a state in which the flexible screen is bent at a second bending angle, and the third bent state is a state in which the flexible screen is at a third bending angle.

In the embodiment of the present disclosure, the first bent state is a non-bent state, and in the process of applying the bending operation by the user to the electronic device, the bending angle of the flexible screen may be changed under the control of the bending operation, and the flexible screen is deformed from the first bent state to the second bent state. Therefore, the first bending angle is different from the second bending angle. After application of the bending operation to the electronic device is stopped, if the bending operation satisfies the preset condition which is previously set, the flexible screen is rebounded to be deformed from the second bent state to the third bent state. In other words, the third bending angle is different from the second bending angle, and the third bending angle may be the same as or different from the first bending angle. Rebounding refers to a physical change from a deformed state under a force to a restored or closely restored state when the external force is released.

In order to facilitate understanding the content of the present disclosure by those skilled in the art, examples of the information processing method according to the present disclosure will be described below.

In a first example, when the flexible screen is in a first bent state, the flexible screen is at a first bending angle of 0 degree, i.e., the flexible screen is currently in a non-bent state. Then, a bending operation is applied by a user to the electronic device to fold the flexible screen in half so that two portions of the flexible screen are fit. In this process, the flexible screen is deformed from the first bent state to a second bent state corresponding to a second bending angle close to 180 degrees. Next, application of the bending operation is stopped to release the electronic device. In this case, if the bending operation satisfies a preset condition, the flexible screen is rebounded to be deformed from the second bent state to a third bent state corresponding to a third bending angle of 0 degree. In other words, after the flexible screen is deformed from the first bent state to the second bent state under an external force, the flexible screen is rebounded from the second bent state to the first bent state after the external force is released.

For example, in a scenario, the flexible screen of the electronic device comprises a first portion and a second portion, and when the first portion and the second portion of the flexible screen are fit, a window displayed on the first portion may be triggered to be moved onto the second portion. It is assumed that the flexible screen is currently in a non-bent state, there is a window displayed on the first portion, and the user needs to move the window onto the second portion for display. In this case, the user may bend the electronic device so that the first portion and the second portion of the flexible screen are fit, thereby moving the window displayed on the first portion onto the second portion. After the bending operation is applied by the user to the electronic device, the flexible screen is deformed from the non-bent state to the second bent state, i.e., the first portion and the second portion are fit. In this case, the window displayed on the first portion is moved onto the second portion, and after the bending operation is no longer applied by the user, the electronic device is rebounded from the second bent state to the first bent state.

According to the above solution, the user needs not to move the window on the display screen by dragging the window; and after the flexible screen is bent from the non-bent state to the bent state, the flexible screen is automatically rebounded to the non-bent state after the external force is released. Therefore, the user needs not to apply a bending operation again to deform the flexible screen from the bent state to the non-bent state, thereby simplifying the users operation in the two aspects described above.

In a second example, when the flexible screen is in a first bent state, the flexible screen is at a first bending angle of 0 degree, i.e., the flexible screen is currently in a non-bent state. Then, a bending operation is applied by a user to the electronic device. In this process, the flexible screen is deformed from the first bent state to a second bent state corresponding to a second bending angle close to 180 degrees. Next, application of the bending operation to the flexible screen is stopped, to release the electronic device. In this case, the flexible screen is rebounded to be deformed from the second bent state to a third bent state corresponding to a third bending angle which may be 145 degrees. In other words, after the flexible screen is deformed from the first bent state to the second bent state under an external force, the flexible screen is not rebounded from the second bent state to the initial state (i.e., the non-bent state) after the external force is released, and is rebounded partly to be deformed from the second bent state to the third bent state.

For example, in a scenario, the user wants to bend the flexible screen to have an annular shape, so that the electronic device is worn on the wrist of the user. If the angle is adjusted by the user himself/herself, the angle needs to be adjusted many times. In the solution according to the embodiment of the present disclosure, after a bending operation is applied by the user to the electronic device, the flexible screen is deformed from the non-bent state to the second bent state, and after the bending operation is no longer applied by the user, the flexible screen is rebounded from the second bent state to the third bent state. The third bent state is a state in which the electronic device (in turn the flexible screen) is at a third bending angle which can match with the shape of the wrist of the user. The third bending angle may be a preset angle, and when the bending angle of the flexible screen is equal to the preset angle, the bending angle can match with the shape of the wrist of the user.

According to the above solution, the user needs not to adjust the bending angle of the electronic device many times, and when the bending operation satisfies the preset condition, the flexible screen is automatically controlled to be bent to a preset angle, thereby accurately controlling the bending angle of the flexible screen.

In the first example described above, an elastic material, for example, plastic or the like may be used to achieve rebounding of the flexible screen. Alternatively, the flexible screen may be rebounded under elasticity of an elastic structure arranged in the electronic device. In the second example described above, the flexible screen may be rebounded under elasticity of an elastic structure arranged in the electronic device, and a rebounding angle may be controlled by a magnitude of the elasticity of the elastic structure. The larger the elasticity is generated, the larger the rebounding angle is reached.

Further, in the embodiment of the present disclosure, when the bending operation does not satisfy the preset condition, the electronic device is controlled to be deformed from the first bent state to the second bent state, and after the bending operation is no longer applied to the electronic device, the electronic device is controlled to maintain unchanged in the second bent state. That is, after application of the bending operation is stopped, the electronic device maintains unchanged in the second bent state.

Second Embodiment

Figure 3:
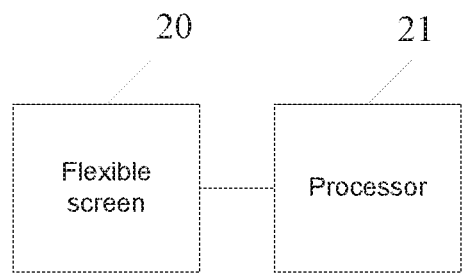
FIG. 3 is a structural block diagram of an electronic device according to a second embodiment of the present disclosure.

Based on the same inventive concept, the embodiment of the present disclosure provides an electronic device. As shown in FIG. 3, the electronic device comprises:

a flexible screen 20;

a processor 21 connected to the flexible screen 20 and configured to detect a bending operation for deforming the flexible screen applied by an operator to the electronic device; determine whether the bending operation satisfies a preset condition or not; and when the bending operation satisfies the preset condition, control the electronic device to be deformed from a first bent state to a second bent state, and after the bending operation is no longer applied to the electronic device, control the flexible screen to be deformed from the second bent state to a third bent state, wherein the first bent state is a state in which the flexible screen is at a first bending angle, the second bent state is a state in which the flexible screen is at a second bending angle, and the third bent state is a state in which the flexible screen is at a third bending angle which is the same as or different from the first bending angle.

Alternatively, the processor 21 is further configured to:

when the bending operation does not satisfy the preset condition, control the flexible screen to be deformed from the first bent state to the second bent state, and after bending operation is no longer applied to the electronic device, control the flexible screen to maintain unchanged in the second bent state.

Alternatively, the processor 21 is further configured to:

determine whether duration of the bending operation is less than preset duration or not, wherein when the duration is less than the preset duration, the bending operation satisfies the preset condition.

Alternatively, the processor 21 is further configured to:

determine whether a pressure corresponding to the bending operation is greater than a preset pressure threshold or not, wherein when the pressure is greater than the preset pressure threshold, the bending operation satisfies the preset condition.

Third Embodiment

Figure 4:
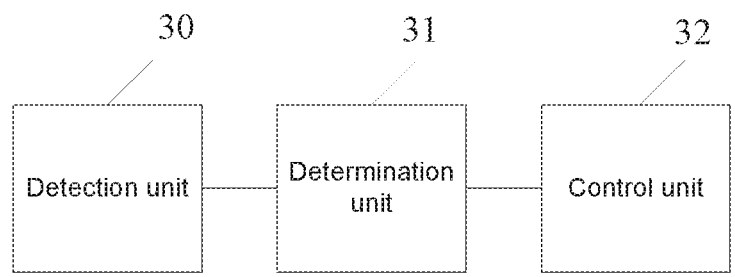
FIG. 4 is a structural block diagram of an electronic device according to a third embodiment of the present disclosure.

The embodiment of the present disclosure further provides an electronic device having a flexible screen. As shown in FIG. 4, the electronic device further comprises:

a detection unit 30 configured to detect a bending operation for deforming the flexible screen applied by an operator to the electronic device;

a determination unit 31 configured to determine whether the bending operation satisfies a preset condition or not; and a control unit 32 configured to, when the bending operation satisfies the preset condition, control the flexible screen to be deformed from a first bent state to a second bent state, and after the bending operation is no longer applied to the electronic device, control the flexible screen to be deformed from the second bent state to a third bent state, wherein the first bent state is a state in which the flexible screen is at a first bending angle, the second bent state is a state in which the flexible screen is at a second bending angle, and the third bent state is a state in which the flexible screen is at a third bending angle which is the same as or different from the first bending angle.

Alternatively, the control unit 32 is further configured to:

when the bending operation does not satisfy the preset condition, control the flexible screen to be deformed from the first bent state to the second bent state, and after bending operation is no longer applied to the electronic device, control the flexible screen to maintain unchanged in the second bent state.

Alternatively, the determination unit 31 is further configured to:

determine whether duration of the bending operation is less than preset duration or not, wherein when the duration is less than the preset duration, the bending operation satisfies the preset condition.

Alternatively, the determination unit 31 is further configured to:

determine whether a pressure corresponding to the bending operation is greater than a preset pressure threshold or not, when the pressure is greater than the preset pressure threshold, the bending operation satisfies the preset condition.

According to the embodiments of the present disclosure, after a bending operation is applied by an operator to the electronic device, the flexible screen is deformed from a first bent state to a second bent state; and it is determined whether the bending operation satisfies a preset condition or not; if the bending operation satisfies the preset condition, after the bending operation is no longer applied to the electronic device, the flexible screen is controlled to be deformed from the second bent state to a third bent state. In other words, after the bending operation is no longer applied to the electronic device, the flexible screen is still deformed from the second bent state to the third bent state which may be the same as or different from the first bent state. Further, as long as the bending operation applied by the user satisfies the preset condition, the flexible screen will finally be bent to the third bent state, so that a bending angle of the flexible screen can be accurately controlled.

Secondly, in the solutions according to the embodiments of the present disclosure, when the bending operation does not satisfy the preset condition, the According to is controlled to be deformed from the first bent state to the second bent state, and after the bending operation is no longer applied to the electronic device, the According to is controlled to maintain unchanged in the second bent state, thereby not only the bending angle of the flexible screen can be accurately controlled, but also the flexible screen can be bent under the control of a manual operation of the user, and improving user experience.

Those skilled in the art should appreciate that the embodiments of the present disclosure can be provided as methods, systems, or computer program products. Therefore, forms such as hardware-only embodiments, software-only embodiments, or embodiments combining software and hardware can be used in the present disclosure. In addition, forms such as a computer program product which is implemented on one or more of computer usable storage media (comprising but not limited to a disk memory, a CD-ROM, an optical memory etc.) with computer usable program codes can be used in the present disclosure.

The present disclosure is described with reference to the flowcharts and/or block diagrams of the methods, devices (systems) and computer program products according to the embodiments of the present disclosure. It should be understood that each flow and/or block in the flowcharts and/or block diagrams as well as a combination of the flows and/or blocks in the flowcharts and/or block diagrams can be implemented by computer program instructions. These computer program instructions can be provided to a processor of a general-purpose computer, a dedicated-purpose computer, an embedded processor, or other programmable data processing devices to generate a machine. Thereby, the instructions executed by the processor of the computer or other programmable data processing devices generate means for implementing functions specified in one or more flows in the flowcharts and/or one or more blocks in the block diagrams.

These computer program instructions can also be stored in a computer readable memory capable of introducing a computer or other programmable data processing devices to operate in a particular mode. Thereby, the instructions stored in the computer readable memory generate an article of manufacture comprising instruction means for implementing functions specified in one or more flows in the flowcharts and/or one or more blocks in the block diagrams.

These computer program instructions can also be loaded onto a computer or other programmable data processing devices, so as to enable a series of operation steps to be performed on the computer or other programmable devices to generate a computer-implemented process. Thereby, the instructions executed on the computer or other programmable devices provide a step of implementing functions specified in one or more flows in the flowcharts and/or one or more blocks in the block diagrams.

Specifically, computer program instructions corresponding to the method for controlling an electronic device according to the embodiments of the present disclosure may be stored on a storage medium such as an optical disk, a hard disk, a USB device etc. When the computer program instructions in the storage medium corresponding to the method for controlling an electronic device are read or executed by an electronic device, the following steps are performed:

detecting a bending operation for deforming the flexible screen of the electronic device applied by an operator to the electronic device;

determining whether the bending operation satisfies a preset condition or not; and controlling the flexible screen to be deformed from a first bent state to a second bent state when the bending operation satisfies the preset condition, and controlling the flexible screen to be deformed from the second bent state to a third bent state after the bending operation is no longer applied to the electronic device, wherein the first bent state is a state in which the flexible screen is at a first bending angle, the second bent state is a state in which the flexible screen is at a second bending angle, and the third bent state is a state in which the flexible screen is bent at a third bending angle which is the same as or different from the first bending angle.

Alternatively, when some other computer instructions stored in the storage medium, which correspond to the step of determining whether the bending operation satisfies a preset condition or not, are executed, the following steps are further performed:

controlling the electronic device to be deformed from the first bent state to the second bent state when the bending operation does not satisfy the preset condition, and controlling the flexible screen to maintain unchanged in the second bent state after bending operation is no longer applied to the electronic device.

Alternatively, when computer instructions stored in the storage medium, which correspond to the step of determining whether the bending operation satisfies a preset condition or not, are executed, the following steps are performed:

determining whether duration of the bending operation is less than preset duration or not, and when the duration is less than the preset duration, the bending operation satisfies the preset condition.

Alternatively, when computer instructions stored in the storage medium, which correspond to the step of determining whether the bending operation satisfies a preset condition or not, are executed, the following steps are performed:

determining whether a pressure corresponding to the bending operation is greater than a preset pressure threshold or not, and when the pressure is greater than the preset pressure threshold, the bending operation satisfies the preset condition.

Although preferable embodiments of the present disclosure have been described, additional changes and modifications can be made to these embodiments by those skilled in the art upon learning the basic creative concepts. Therefore, the appended claims are intended to be construed as comprising the preferable embodiments and all changes and modifications that fall into the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

I claim:

1. A method for controlling an electronic device, comprising:

detecting, by the electronic device, a bending operation for deforming a flexible screen of the electronic device applied by an operator to the flexible screen of the electronic device;

determining, by the electronic device, whether the bending operation satisfies a preset condition or not; and controlling the flexible screen to be deformed from an initial state to a second bent state, and when the duration of the bending operation is less than a preset duration and the pressure corresponding to the bending operation is greater than a preset pressure threshold, automatically controlling, by at least one motor of the electronic device, the flexible screen to be deformed from the second bent state to a third bent state after the bending operation is no longer applied to the electronic device, wherein the initial state is a state in which the flexible screen is bent at a first bending angle, the second bent state after the initial state is a state in which the flexible screen is bent at a second bending angle, and the third bent state after the second state is a state in which the flexible screen is bent at a third bending angle which is the same as or different from the first bending angle;

wherein the flexible screen comprises a first portion and a second portion, and wherein an application is moved from the first portion to the second portion when the flexible screen is in a second bent state that the first portion and the second portion are fit.

2. The method according to claim 1, further comprising:

controlling the flexible screen to be deformed from the initial state to the second bent state when the duration of the bending operation is greater than the preset duration, and controlling the flexible screen to maintain unchanged in the second bent state after bending operation is no longer applied to the electronic device.

3. An electronic device, comprising:

a flexible screen; and a processor connected to the flexible screen and configured to detect a bending operation for deforming the flexible screen applied by an operator to the flexible screen of the electronic device;

determine whether the bending operation satisfies a preset condition; and control the flexible screen to be deformed from an initial state to a second bent state, and when the duration of the bending operation is less than a preset duration and the pressure corresponding to the bending operation is greater than a preset pressure threshold, automatically control the flexible screen, by at least one motor of the electronic device, to be deformed from the second bent state to a third bent state after the bending operation is no longer applied to the electronic device, wherein the initial state is a state in which the flexible screen is bent at a first bending angle, the second bent state after the initial state is a state in which the flexible screen is bent at a second bending angle, and the third bent state after the second state is a state in which the flexible screen is bent at a third bending angle which is the same as or different from the first bending angle;

wherein the flexible screen comprises a first portion and a second portion, and wherein an application is moved from the first portion to the second portion when the flexible screen is in a second bent state that the first portion and the second portion are fit.

4. The electronic device according to claim 3, wherein the processor is further configured to:

control the flexible screen to be deformed from the initial state to the second bent state when the duration of the bending operation is greater than the preset duration, and control the flexible screen to maintain unchanged in the second bent state after bending operation is no longer applied to the electronic device.

* * * * *